US011484887B2

(12) United States Patent
Downie et al.

(10) Patent No.: US 11,484,887 B2
(45) Date of Patent: Nov. 1, 2022

(54) MEASURING MAGNETITE BUILDUP IN A MAGNETIC FILTER

(71) Applicant: ADEY HOLDINGS (2008) LIMITED, Cheltenham (GB)

(72) Inventors: Simon Downie, Cheltenham (GB); Matthew Taylor, Cheltenham (GB)

(73) Assignee: ADEY HOLDINGS (2008) LIMITED, Cheltenham (GB)

( * ) Notice: Subject to any disclaimer, the term of this patent is extended or adjusted under 35 U.S.C. 154(b) by 447 days.

(21) Appl. No.: 16/094,581

(22) PCT Filed: Jun. 28, 2016

(86) PCT No.: PCT/GB2016/051938
§ 371 (c)(1),
(2) Date: Oct. 18, 2018

(87) PCT Pub. No.: WO2017/182764
PCT Pub. Date: Oct. 26, 2017

(65) Prior Publication Data
US 2020/0324299 A1 Oct. 15, 2020

(30) Foreign Application Priority Data
Apr. 19, 2016 (GB) .................................... 1606795

(51) Int. Cl.
*B03C 1/28* (2006.01)
*B03C 1/033* (2006.01)
(Continued)

(52) U.S. Cl.
CPC ............ *B03C 1/286* (2013.01); *B03C 1/0332* (2013.01); *B03C 1/282* (2013.01); *B01D 35/06* (2013.01);
(Continued)

(58) Field of Classification Search
CPC ...................................................... B03C 1/282
See application file for complete search history.

(56) References Cited

U.S. PATENT DOCUMENTS 4,784,762 A 11/1988 Taliaferro
5,118,410 A 6/1992 Rumberger
(Continued)

FOREIGN PATENT DOCUMENTS

DE 9001431 5/1990
EP 2524730 A2 11/2012
(Continued)

*Primary Examiner* — David C Mellon
(74) *Attorney, Agent, or Firm* — Jacob M. Ward; Ward Law Office LLC

(57) ABSTRACT

A magnetite level monitoring device for a magnetic filter in a central heating system, the magnetic filter including a separation chamber, an inlet to the chamber and an outlet from the chamber, and a magnetic element disposed within the chamber for attracting magnetic particles and removing the magnetic particles from the system water as it flows through the chamber, and the monitoring device including: a housing for placing adjacent to the outside of the separation chamber; a magnetometer mounted to the housing; a magnetic field guide mounted to the housing, the magnetic field guide being disposed between the magnetometer and the outside of the separation chamber, when the housing is mounted to the separation chamber; and output means adapted to issue a notification when the output from the magnetometer exceeds a predetermined threshold.

8 Claims, 5 Drawing Sheets

(51) Int. Cl.
  *B01D 35/06* (2006.01)
  *F24D 19/00* (2006.01)
(52) U.S. Cl.
  CPC ...... *B03C 2201/18* (2013.01); *B03C 2201/24* (2013.01); *B03C 2201/28* (2013.01); *F24D 19/0092* (2013.01)

(56) References Cited

U.S. PATENT DOCUMENTS

| | | | |
|---|---|---|---|
| 6,143,171 A * | 11/2000 | Van Aarsen | B01J 19/087 |
| | | | 123/538 |
| 10,543,492 B2 * | 1/2020 | Rhodes | B03C 1/0335 |
| 2006/0283783 A1 * | 12/2006 | Adey | C02F 1/488 |
| | | | 209/39 |
| 2007/0090055 A1 | 4/2007 | Newman et al. | |
| 2015/0068964 A1 | 3/2015 | McAllorum et al. | |
| 2015/0377987 A1 | 12/2015 | Menon et al. | |
| 2018/0221796 A1 * | 8/2018 | Bonifas | B01D 46/0005 |
| 2020/0254462 A1 * | 8/2020 | Downie | G01R 33/0082 |
| 2021/0276894 A1 * | 9/2021 | Bossini | C02F 1/488 |

FOREIGN PATENT DOCUMENTS

| | | |
|---|---|---|
| EP | 2977688 A1 | 1/2016 |
| EP | 3159313 A1 | 4/2017 |
| FR | 2566283 A1 | 12/1985 |
| FR | 2697760 A1 | 5/1994 |
| GB | 2029580 A | 3/1980 |
| GB | 2491246 A | 11/2012 |
| GB | 2500908 A | 10/2013 |

\* cited by examiner

MEASURING MAGNETITE BUILDUP IN A MAGNETIC FILTER

CROSS-REFERENCE TO RELATED APPLICATIONS

This patent application is a United States National Stage Patent Application of International Patent Application No. PCT/GB2016/051938, filed Jun. 28, 2016, which in turn claims the benefit of Great Britain Patent Application No. 1606795.1, filed Apr. 19, 2016. The entire disclosures of the above patent applications are hereby incorporated herein by reference.

FIELD

The present invention relates to measuring the amount of magnetite which has been captured by a magnetic filter, particularly a magnetic filter used in a central heating system.

BACKGROUND TO THE INVENTION

It is now common to fit a magnetic filter to a central heating system circuit. In its most basic form, a magnetic filter for a central heating system includes a separation chamber, an inlet to the chamber and an outlet from the chamber, and a magnetic element disposed within the chamber for attracting magnetic particles and removing the magnetic particles from the system water as it flows through the chamber. An example of this type of magnetic filter is disclosed in GB2491246. The magnetic particles are collectively termed 'Magnetite'.

Captured magnetic particles are typically held on the magnetic element within the filter, until at some point the filter is at capacity and can no longer capture further particles. The filter then becomes ineffective until it is cleaned to remove the captured particles. Various different filters are cleaned in different ways. The most basic method is to disconnect the filter from the central heating system circuit, open the chamber, remove the magnetic element and clean the magnetite off the magnetic element by scraping or wiping. In most filters, the magnetic element includes a magnet surrounded by a nonmagnetic sleeve. This arrangement makes the cleaning process easier because the magnetite sticks to the sleeve, when the magnet is located within the sleeve, but will easily fall away when the magnet is removed. In some filters, the magnet can be removed from the sleeve without opening the chamber. These filters can be cleaned by isolating the chamber from the circuit, removing the magnet, and opening a drain valve to release water and flush out captured magnetite.

In all known magnetic filters for heating systems, cleaning is a process which requires manual intervention in one way or another. Usually, installers will recommend that the filter is cleaned on a regular basis, for example annually which is also the usual service interval for a gas boiler.

The problem with specifying a set time period is that in fact magnetic filters capture different amounts of magnetite, depending on the system in which they are installed and the concentration of corrosion inhibitor in the system. A larger system with more radiators obviously has the potential to generate larger quantities of magnetite. Radiators are also made from different materials, and cast iron radiators typically corrode more than steel radiators, creating more magnetite. Open vented systems are likely to suffer from corrosion more than sealed systems. Also, a magnetic filter newly fitted to an old heating system will initially capture large quantities of magnetite, but if the system is correctly dosed with inhibitor and sealed to prevent oxygen ingress, then the rate of magnetite capture should drop off over time, after the filter is installed.

For these reasons, it is difficult to estimate an appropriate service interval for a magnetic filter. The typical service interval of 12 months may be unnecessarily frequent in a brand new system which is sealed and dosed with inhibitor, but a magnetic filter just fitted to an old system might be full to capacity within one or two months.

If the rate of capture of magnetite in fact increases over time, then this is an indication that there is a problem with the heating system, for example a leak resulting in dilution of the inhibitor and/or a point of air ingress into the system. It is not unusual for minor leaks to occur which go unnoticed by the home owner, for example a slowly weeping joint where water is evaporated directly from the hot pipe-work. Also, an incorrectly seated pressure relief valve can cause a slow drip from the external vent pipe, which again may not be noticed.

This kind of leak will eventually cause the system to lose pressure, at which point the heating circuit must be topped-up to avoid boiler shutdown. When clean water is introduced into the system water any chemical inhibitor will be diluted. If this dilution continues over a long period of time then the inhibitor will become ineffective.

It is obviously preferable to identify such problems at an early stage, but it is difficult to identify an increase in the magnetite capture rate if the magnetic filter is only opened occasionally. In magnetic filters which are cleaned by flushing through without opening, it is difficult to estimate to any degree of precision the amount of magnetite that is actually being removed. There is also currently no cost-effective means of directly measuring dilution of inhibitor in the system water.

It is an object of the present invention to provide a means of monitoring the amount of magnetite captured within a magnetic filter.

STATEMENT OF INVENTION

According to a first aspect of the present invention, there is provided a method of measuring the amount of magnetite captured by a magnetic filter in a central heating system circuit, the magnetic filter including a separation chamber, an inlet to the chamber and an outlet from the chamber, and a magnetic element disposed within the chamber for attracting magnetic particles and removing the magnetic particles from system water as it flows through the chamber, and the method comprising the steps of:

providing a magnetometer at a fixed point relative to the magnetic element;

reading the output of the magnetometer; and indicating on an output means if the output from the magnetometer is above a predetermined threshold or is below a predetermined threshold.

The indication may include, in a simple form, for example turning on an LED or sounding a buzzer. In some embodiments, a display or other output means may be provided for indicating when more than one predetermined level is reached. For example, in one embodiment, four LEDs are provided indicating 25% full, 50% full, 75% full and 100% full. However, the simplest embodiment may just have a single indication that the filter is full, or nearly full (e.g. 75% full).

In some embodiments, the output of the magnetometer may be monitored substantially continuously, the indication being issued whenever the output exceeds or drops below the predetermined threshold. However, in some embodiments the output of the magnetometer is only read for a short period, for example whilst a momentary pushbutton is depressed. In a "push to test" system the output means simply indicates whether or not, during the test, the output of the magnetometer is above or below the predetermined threshold. This may take the simple form of a single LED which is lit when the output is above the threshold, and not lit when the output is below the threshold, or vice versa.

The magnetometer may be provided on the outside of the chamber, for example fixed to the outside of the wall of the chamber. However, as long as the magnetometer is held in a fixed position relative to the magnetic element, the output of the magnetometer can be used to estimate the amount of magnetite captured on the magnetic element.

The predetermined threshold can be selected to match the characteristics of the particular magnetic filter to which the method is being applied. Devices are envisaged which are adjustable or tunable to work with different filters. In other words, the predetermined threshold may be variable. It is noted that even apparently identical filters of the same model may have varying magnetic characteristics, and so it may be that the predetermined threshold needs to be specifically selected for each individual filter. However, it is expected that acceptable results may be achieved in most cases by pre-setting a device with a predetermined threshold which will be appropriate at least for all filters of the same manufacturer and model.

In use, as magnetic particles (typically iron and iron oxide 'magnetite') collect on the magnet within the chamber, the magnetic field strength at the fixed point changes. Because of the typical formation of magnetic element (which is usually made from multiple magnetic billets facing each other north-to-north and south-to-south), the build-up of magnetite is a complex 3D shape, and the magnetic field strength at the chamber wall increases with magnetite build-up in some places and decreases in other places. Different embodiments may therefore trigger the indication either when the magnetometer reading exceeds a threshold, or when it drops below a threshold, depending on where the magnetometer is positioned in the particular embodiment. For the same reason, the output from the magnetometer may be positive or negative. It may be increasingly or decreasingly positive or increasingly or decreasingly negative, as magnetite builds up.

The magnetometer may be a relative magnetometer. The output of a relative magnetometer is directly proportional to the magnetic field strength, with a fixed but uncalibrated offset. An absolute measurement of the magnetic field strength cannot therefore be directly derived from a relative magnetometer. Where a relative magnetometer is used, the method may include the step of measuring the output from the magnetometer when the filter is empty of magnetite, and calculating the predetermined threshold by adding a fixed offset to the measured 'empty' value. To facilitate this, the method may include the step of accepting an indication via input means that the filter is empty, which could either be because the filter is brand new, or because it has just been cleaned. It will be understood that the offset may be positive or negative.

As an alternative, the magnetometer may be an absolute magnetometer.

The magnetometer may be any device which is suitable for measuring magnetic forces, and the term includes, for example, Hall-effect sensors and coils.

In a simple embodiment, the input means for indicating that the filter is empty may be a simple pushbutton.

'Recalibrating' the magnetometer every time the filter is cleaned by indicating that the filter is empty should not be strictly necessary, although if the magnetometer is recalibrated on cleaning then this should take account of any change in the magnetization of the magnetic element in the filter which may occur over time, whatever type of magnetometer is used.

A magnetic field guide may be provided. The magnetic field guide may be disposed between the magnetometer and the magnetic element, for example between the magnetometer and the chamber, where the magnetometer is on the outside of the chamber. Alternatively, the magnetic field guide may be disposed in other places, for example around the magnetometer or behind the magnetometer (i.e. with the magnetometer disposed between the magnetic field guide and the magnetic element). The magnetic field guide guides magnetic field lines to a region (which may be on the outside of the chamber) where the magnetometer is located. The magnetic field guide is preferably made from a material having low magnetic reluctance, but which is difficult to permanently magnetize. It is found that stainless steel grade 430 is a useful material for forming the magnetic field guide.

In some embodiments, multiple components disposed at different locations may be provided to form a magnetic field guide for guiding the magnetic field lines.

The purpose of the magnetic field guide is to compensate for variation in the direction of the magnetic field from the magnetic element inside the chamber. Many magnetic filters use a magnetic element which is formed from a stack of substantially cylindrical permanent magnet billets which are magnetised with the north and south poles being nominally at either flat end of the cylinder. The magnetic billets are positioned in the stack adjacent to each other north-to-north and south-to-south. However, it is found that it is difficult to obtain an economical supply of billets which are magnetised in a straight line, through the central axis of the billet. Many magnetic filters contain billets which have the magnetic axis skewed from the physical axis by up to 20°. This does not significantly impact the effectiveness of the magnetic filter in attracting and retaining magnetite, but it does make it difficult to reliably interpret the output of a magnetometer to determine how much magnetite has been retained within a filter.

The magnetic field guide effectively pulls the magnetic field lines to a known point, so that the correlation between the magnetometer output and the amount of captured magnetite is more consistent across a range of different magnets with varying characteristics.

The method may further comprise the steps of sampling and recording the magnetometer reading, and determining a rate of change from the recorded readings. The rate of change correlates to the growth rate of magnetite on the magnet within the filter. It will be understood that an increase in rate of change can mean an increasing rate of change in increasingly or decreasingly negative values as well as an increasing rate of change in increasingly or decreasingly positive values. Whether the readings from the magnetometer are increasingly or decreasingly negative or increasingly or decreasingly positive depends only on the position and orientation of the magnetometer relative to the position and orientation of the magnetic element. The magnetite growth rate would normally be expected to stay reasonably constant or decrease slightly, as any oxygen dissolved in the system water is used up, and as any magnetite present in the system at the time when the filter is installed is captured and removed. An increasing growth rate may therefore be an indication of a problem, for example that there is a leak in the system or that the system is not dosed with the correct level of inhibitor. An indication may be issued on the output means if the increase in growth rate is above a particular threshold. In a simple embodiment, an increasing growth rate may be identified by monitoring the time taken for the filter to fill up after each time it is cleaned, that is the time taken for the magnetometer reading to reach the predetermined threshold. A decreasing 'service required' interval may indicate a problem.

The method may further include the steps of providing a pressure sensing means to measure the static pressure within the separation chamber, sampling and recording static pressure measurements, and identifying pressure increase events from the recorded data. A pressure increase event may be defined as an increase in the system pressure of above a pre-determined amount, which takes place in less than a pre-determined period. For example, an increase of more than 0.5 bar in less than 3 minutes. A pressure increase event is likely to indicate that water has been added to the heating system via the filling loop.

An indication may be issued on the output means after a pre-determined number of pressure increase events. The indication provides an alert that water has been added to the system, potentially diluting the amount of inhibitor in the system water. Alternatively or additionally, the indication may be issued dependant on a combination of magnetite growth rate data and pressure sensing data. The combination of these two data sources may be used to make a reasonably accurate estimate of the level of dilution of inhibitor in the system.

Where a pressure transducer is provided, an alert may be issued when the pressure falls below a pre-determined threshold. The threshold may be set above the pressure at which a boiler will typically shut down, but below the normal working pressure of the system.

In a simple embodiment, the indication(s) issued on the output means may be simple visual or audible outputs such as turning on an LED or activating a sounder. However, in some embodiments the indication(s) may issue over wired or wireless text or data communication means, for example a GSM module for sending SMS text messages or packet data. Additionally, where communication means are provided, the input indication(s) that the filter has been cleaned may be received via the data communication means.

Examples of suitable data communication means include a GSM module, a Bluetooth (R™) module, a Bluetooth low energy module, a 'Z Wave' module, a 'Zigbee' module, a low power radio module and a WiFi module. Various other wireless communication means will be within the knowledge of the skilled person. Wired communication means may also be suitable in some embodiments. The choice of communication means will depend on factors such as available power supply, coverage of public mobile telephone networks at the installation site, etc.

According to a second aspect of the invention, there is provided a magnetite level measuring device for a magnetic filter in a central heating system, the magnetic filter including a separation chamber, an inlet to the chamber and an outlet from the chamber, and a magnetic element disposed within the chamber for attracting magnetic particles and removing the magnetic particles from the system water as it flows through the chamber, and the measuring device including:

a housing for placing in a fixed position relative to the magnetic element;

a magnetometer mounted to the housing; and output means adapted to indicate whether the output from the magnetometer is above or below a predetermined threshold.

DESCRIPTION OF THE DRAWINGS

For a better understanding of the invention, and to show more clearly how it may be carried into effect, an embodiment will now be described by way of example only, with reference to the accompanying drawings in which.

DESCRIPTION OF EMBODIMENTS

Figure 1:
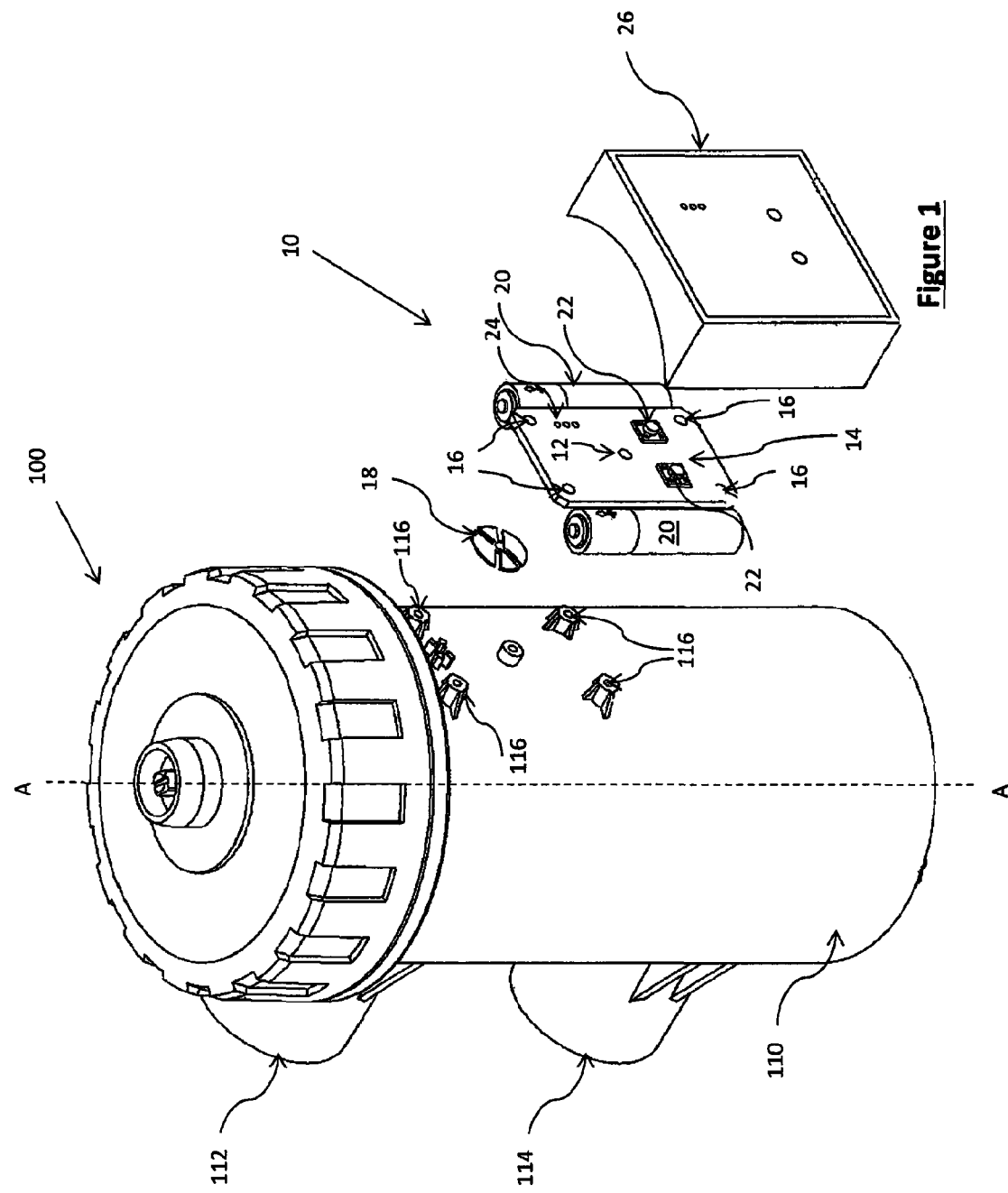
FIG. 1 shows a perspective exploded view of a monitoring device according to the invention, with a magnetic filter.

Referring firstly to FIG. 1, a magnetite level monitoring device is indicated generally at 10, shown with a magnetic filter 100. The magnetic filter comprises a separation chamber 110, an inlet 112 to the separation chamber 110 and an outlet 114 from the separation chamber 110. A magnet (not visible in the Figure) is disposed within the chamber, running substantially centrally along the longitudinal axis A-A of the chamber. In use, the inlet and outlet 112, 114 are connected to a central heating system circuit, so that water flows through the separation chamber 110. Any magnetic particles suspended in the system water are attracted by and retained on the magnet, and remain on the magnet within the chamber until it is cleaned.

The monitoring device 10 includes a magnetometer 12. In this embodiment, the magnetometer is provided in the form of a surface mountable integrated circuit, which is soldered to a printed circuit board 14. In this embodiment, a Honeywell (R™) HMC5883L 3-Axis Digital Compass IC is used. The printed circuit board 14 also mounts and provides connections between other electronics which will not be described in detail, but will be familiar to the skilled person.

The PCB 14 is provided with apertures 16 at each of its four corners. The apertures 16 correspond with mounts 116 on the outside of the separator chamber 110, so that the PCB 14 (and therefore the magnetometer 12) can be firmly attached and held in a fixed position on the outside of the separator chamber using screws.

A magnetic field guide 18 is held between the separator chamber 110 and the magnetometer 12. In this embodiment, the magnetic field guide is substantially circular in shape, having four radial cut-outs. It has been found that apertures or cut-outs in some circumstances improve the performance of the magnetic field guide 18 in terms of presenting a consistent variance in magnetic field at the point where the magnetometer 12 is attached, across a wide range of different magnets. In other embodiments, the magnetic field guide may be a different shape.

In this embodiment, a power source for the electronics is provided by a pair of cells 20, mounted either side of the PCB 14. Input means for accepting an indication that the filter is empty, and for resetting the device (i.e. clearing any stored values in memory) are provided in the form of a pair of pushbuttons 22, surface mounted to the PCB 14. In this embodiment, the output means are provided in the form of LEDs 24.

A snap-over cover 26 is provided to enclose and protect the electronics, the cover including apertures or appropriate interfaces for operating the pushbuttons 22, and for viewing the LEDs 24.

Figure 2:
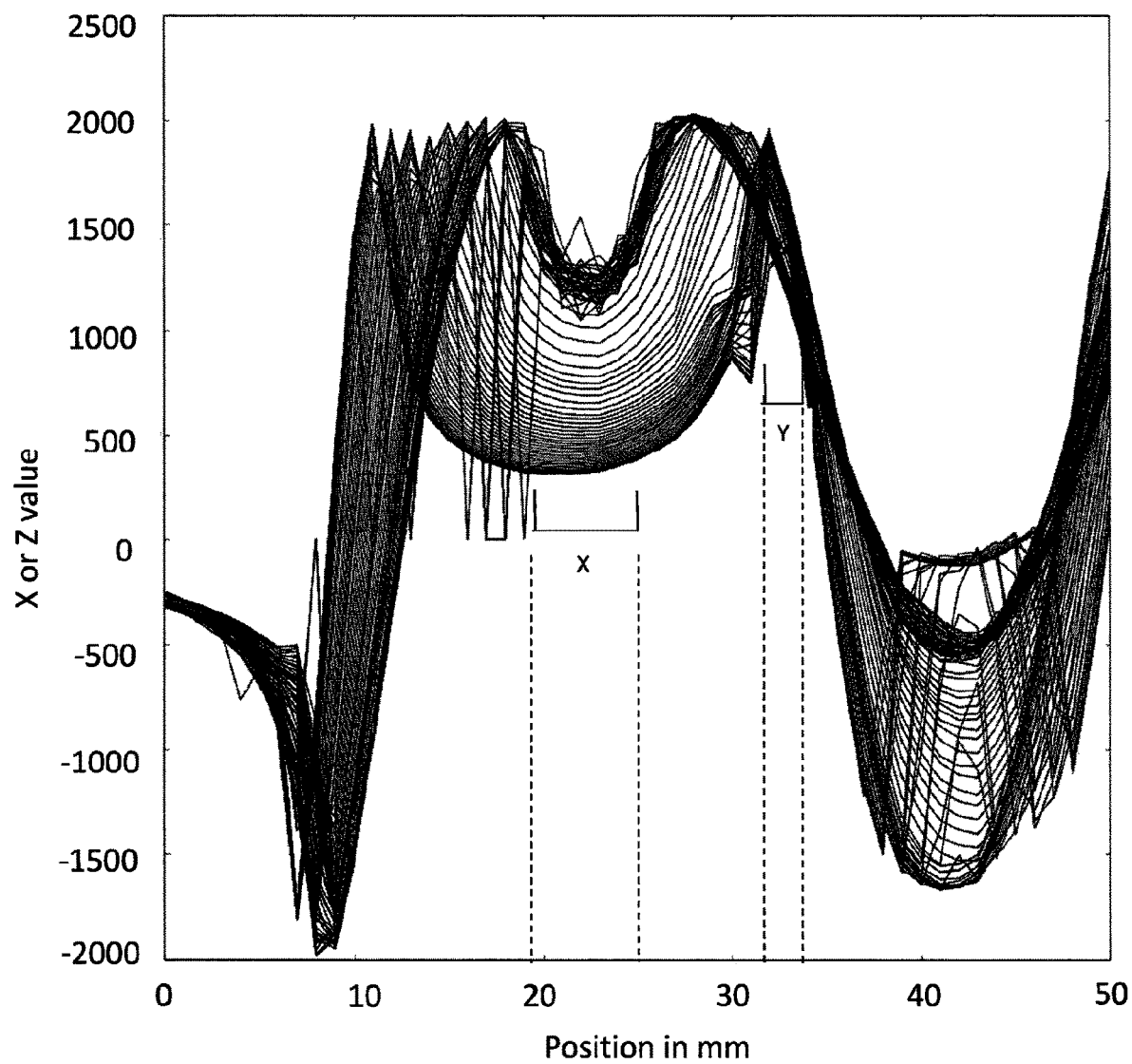
FIG. 2 is a graph showing the magnetometer output with the magnetometer positioned at various different locations on the outside of the filter, and with varying amounts of magnetite in the filter.

Referring now to FIG. 2, the graph shows the results of an experiment to determine the optimum position to place the magnetometer, on a particular model of magnetic filter.

Each line on the graph represents a different level of magnetite dosing. The X-axis is the vertical position of the magnetometer in mm, and the Y axis is the output from the magnetometer. Note that the vertical position on the X-axis is measured from a zero point located around 12 mm from the underside of the canister lip.

The magnetic element in the filter is of a type typical to this application, formed from a stack of substantially cylindrical billets having north and south poles nominally on opposing flat faces, the magnets in the stack being disposed with like poles facing each other.

It is clear that a magnetometer positioned in the region indicated X will provide a much more useful output than (for example) a magnetometer positioned in the region indicated Y. In region X, there is a relatively large and consistent increase in the output from the magnetometer for an increased level of magnetite dosing. For this particular magnetic filter, therefore, the magnetometer should be positioned and held in position around 23 mm measured from the zero point, i.e. around 35 mm from the underside of the canister lip. For other types of magnetic filter, for example with different diameter/length of canister, different sizes, positions, and characteristics of the magnet and the pole pieces within the magnet, the optimal distance will be different, but can be measured for a particular type of filter in the way described.

Figure 3:
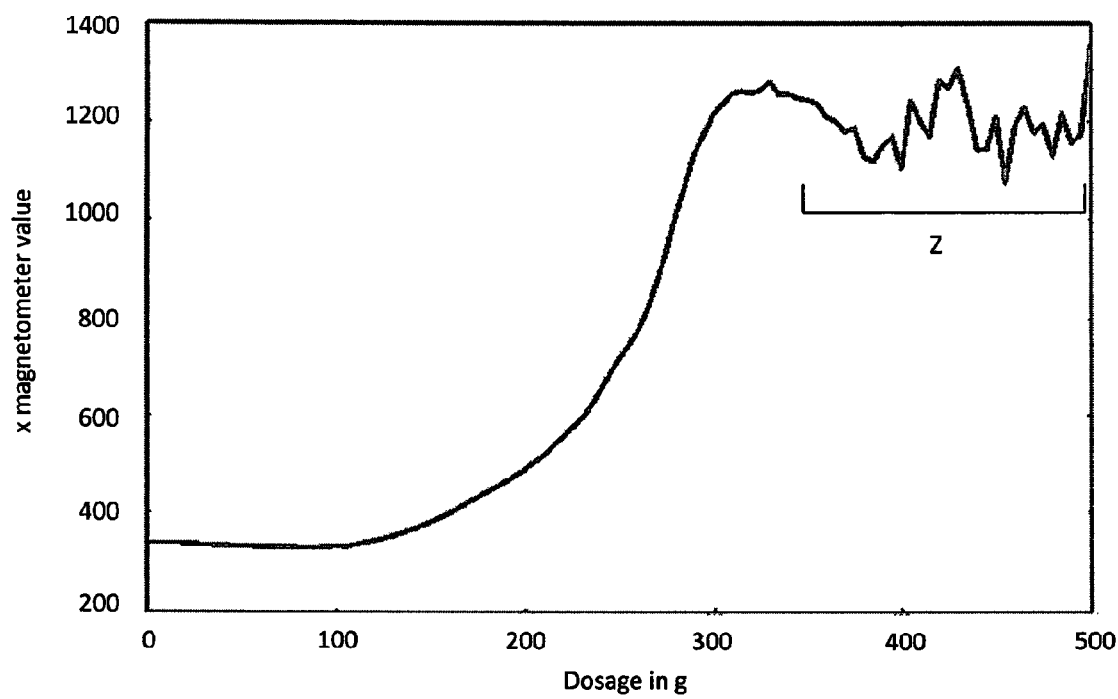
FIG. 3 is a graph showing the magnetometer output with the magnetometer at a fixed position on the outside of the filter, with varying amounts of magnetite in the filter.

FIG. 3 shows the output from a magnetometer at this position. The X axis is the amount of magnetite added to the system, and the Y axis is the output of the magnetometer. It is evident that there is a good clear relationship between the two variables. The noisy region to the right of the graph (region Z) corresponds to a dosage of magnetite which is greater than the capturing capacity of the magnetic filter. If magnetite continues to be added after the filter is at capacity, significant quantities of magnetite remain suspended in the system water as it passes through the filter and this affects the magnetometer reading in an unpredictable way. However, it is clear that by setting an appropriate threshold value and/or maintaining a memory of previous readings, the device will be able to identify when the filter is full, and ignore anomalous readings caused by suspended magnetite once the filter stops capturing.

In this embodiment, with the magnetometer around 23 mm from the zero point, the magnetometer reading increases as magnetite builds up on the magnetic element. In this embodiment therefore the notification will issue when the magnetometer reading exceeds the predetermined threshold. However, in other embodiments with the magnetometer in different positions, or where the magnetic filter includes a different type of magnetic element, the magnetometer reading may decrease as magnetite builds up. In such embodiments, the notification will issue when the magnetometer drops below a predetermined threshold, rather than when it increases above it.

Figure 4:
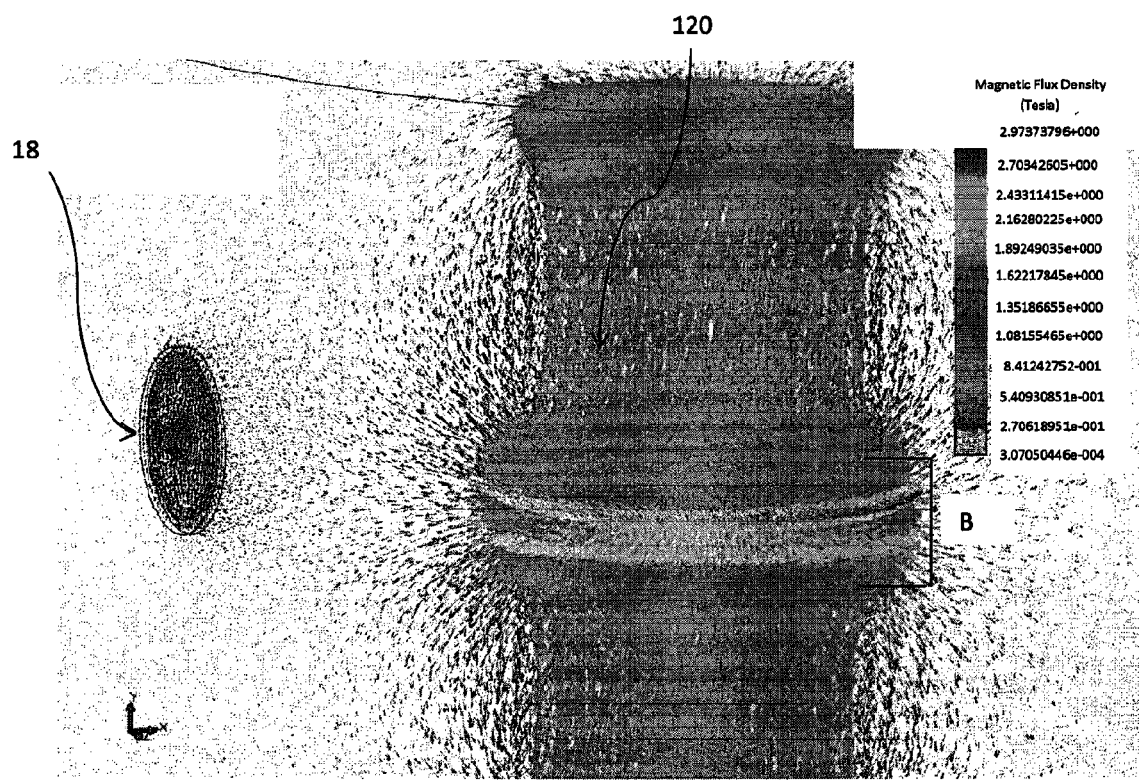
FIG. 4 is a graphic from a computer model, showing the effect of a magnetic field guide.

FIG. 4 is a computer model of the magnetic flux around a magnetic element 120 from a typical magnetic filter, in the presence of a magnetic field guide 18. Lighter areas of the graphic indicate greater magnetic flux density, which is particularly evident where like poles of adjacent magnetic billets meet, in the region indicated B. The magnetic field guide 18 'pulls' the magnetic field lines to a single known region, and it is found that this leads to a more predictable correlation between magnetic field strength and magnetite level, for a range of magnetic elements, including magnetic elements with billets having magnetic axes significantly skewed from their centre.

The monitoring device will alert a householder, heating engineer etc. when the filter is full and needs to be cleaned. This ensures that the filter continues to effectively protect the boiler by continually removing magnetite, without requiring an unnecessarily frequent servicing interval.

Figure 5:
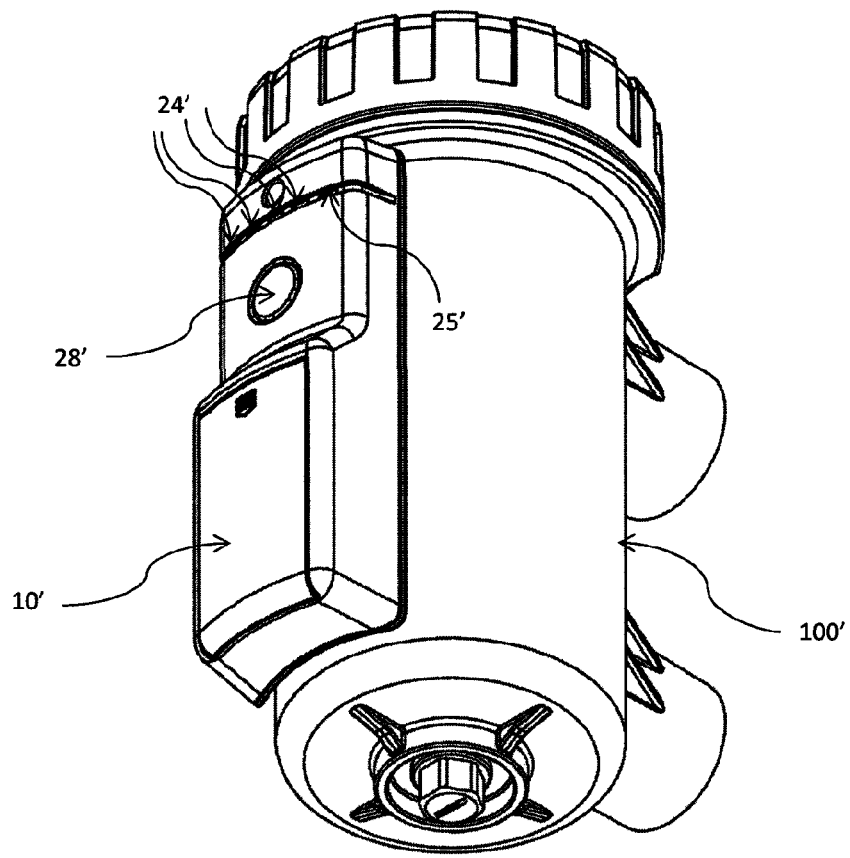
FIG. 5 is a perspective view of a measuring device in an alternative embodiment of the invention.
Figure 6:
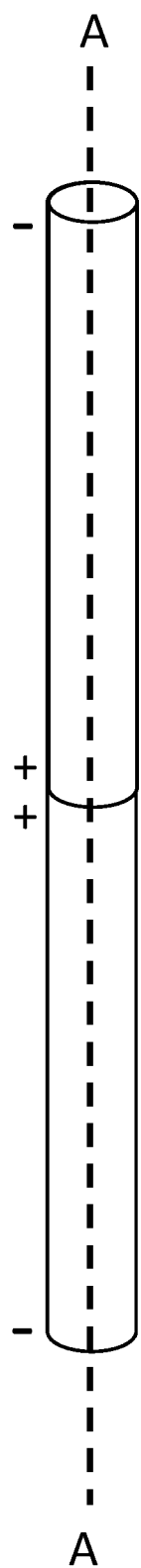
FIG. 6 is a perspective view of a stack of substantially cylindrical magnetic billets contained within the magnetic filter positioned along a central longitudinal axis of the filter (A-A) as shown in FIG. 1.

Referring now to FIG. 5, an alternative embodiment of a measuring device 10' is shown, installed on a magnetic filter 100'. The measuring device 10' differs from the monitoring device 10 in that the measuring device 10' is not 'always on'. It does not therefore constantly monitor the level of magnetite in the filter, but instead relies on a 'push to test' system. A single momentary pushbutton 28' is provided, and when held down the measuring device is turned on. The amount of magnetite is measured with a magnetometer as described above, and the output is shown on a series of four LEDs 24'. The LEDs indicate 25%, 50%, 75% and 100% full. As an example, when the filter is 50% full the 25% and 50% LEDs will be illuminated, and when the filter is 100% full all of the LEDs 24' will be illuminated.

A further LED 25' illuminates in a 'battery low' condition, to prompt the user to replace the batteries in the device.

When the pushbutton 28' is not depressed, all of the LEDs 24', 25' are off, and no power is drawn from the batteries.

As is apparent from the drawings, the measuring device 10' has a different physical layout and configuration as compared with monitoring device 10. However, the two devices include the same essential components and work in generally the same way, except that the measuring device 10' only operates when the pushbutton 28' is depressed. It is envisaged that monitoring devices, possibly including communication means, could be provided in a casing similar to that shown in FIG. 5.

The invention claimed is:

1. A method of measuring the amount of magnetite captured by a magnetic filter in a central heating system,
   the magnetic filter including a separation chamber, an inlet to the chamber and an outlet from the chamber, and a magnetic element disposed within the chamber for attracting magnetic particles and removing the magnetic particles from system water as the system water flows through the chamber, the magnetic element including a single stack of substantially cylindrical magnetic billets, each cylindrical magnetic billet having two opposing flat faces and a curved surface, each cylindrical magnetic billet having north and south poles which are nominally on opposing flat faces of the billets, the billets being disposed with like poles facing each other, each of the billets being disposed on a central longitudinal axis of the magnetic filter, the central longitudinal axis of the filter passing through the centre of each of the flat faces of each of the billets, and the method comprising the steps of:

providing a magnetometer at a fixed-point relative to the magnetic element, the fixed point being a predetermined distance from an end of the filter;

reading an output of the magnetometer;

issuing an indication on an output means when the output from the magnetometer exceeds or drops below a predetermined threshold;

sampling and recording of the output of the reading; and determining a rate of change from the recorded readings.

2. The method of claim 1, wherein the magnetometer is provided on a fixed point on an outside of the chamber.

3. The method of claim 1, wherein the magnetometer is of a type in which the output is directly proportional to a magnetic field strength, with a fixed but uncalibrated offset.

4. The method of claim 3, further comprising steps of measuring the output from the magnetometer when the filter is empty of magnetite, and calculating the predetermined threshold by adding a fixed offset to the measured value.

5. The method of claim 1, wherein the rate of change is recorded at intervals and in which an indication is issued on the output means if the rate of change increases.

6. The method of claim 1, wherein a pressure sensing means is provided for sensing a static pressure within the separation chamber.

7. The method of claim 6, further comprising a step of sampling and recording static pressure measurements.

8. The method of claim 6, wherein the pressure sensing means includes a step of sampling and recording static pressure measurements, and in which an indication is issued on the output means dependant on a combination of magnetite growth rate data from the output of the magnetometer and pressure sensing data.

* * * * *